A. G. PAUL.
VALVE FOR USE IN HEATING SYSTEMS.
APPLICATION FILED JUNE 19, 1913.
1,237,252.
Patented Aug. 14, 1917.
2 SHEETS—SHEET 1.
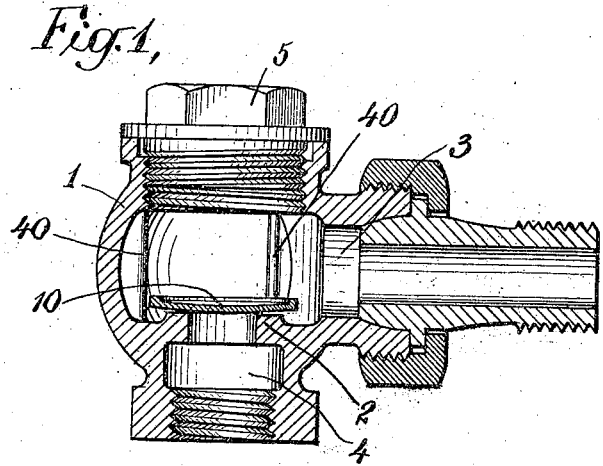
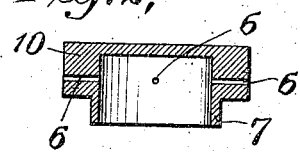
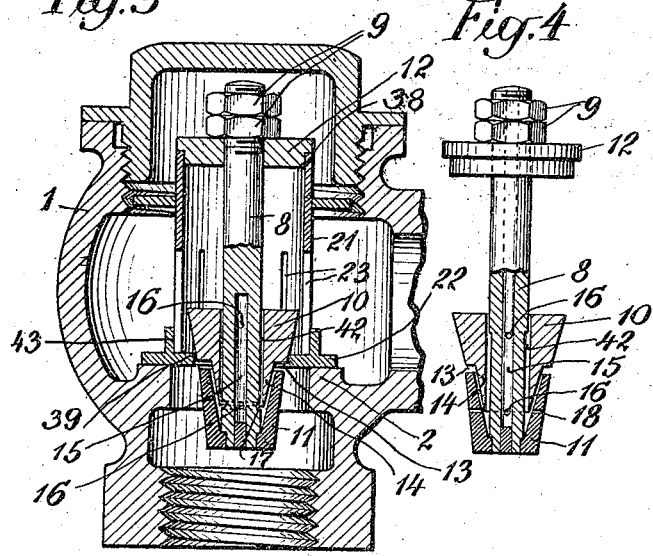
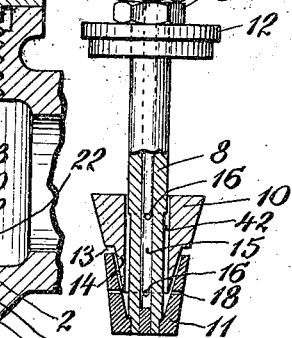
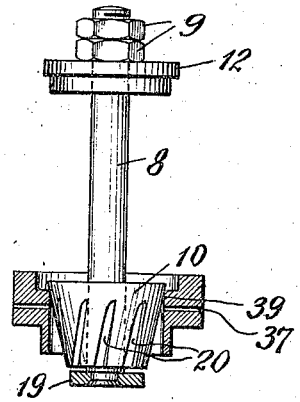
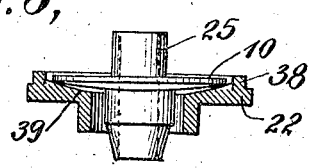
WITNESSES
Newton A. Burgess.
John O. Templer.
INVENTOR,
Andrew G. Paul,
BY
Kenyon & Kenyon,
his ATTORNEYS.

A. G. PAUL.
VALVE FOR USE IN HEATING SYSTEMS.
APPLICATION FILED JUNE 19, 1913.
1,237,252.
Patented Aug. 14, 1917.
2 SHEETS—SHEET 2.
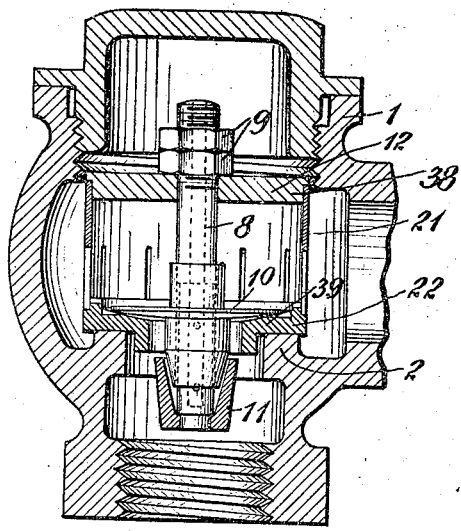
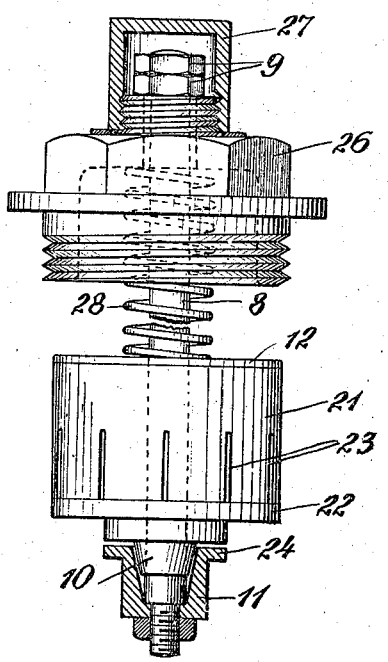
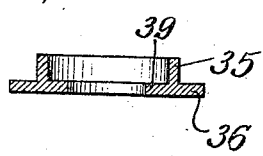
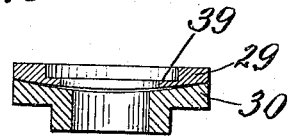
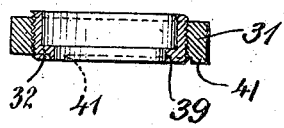
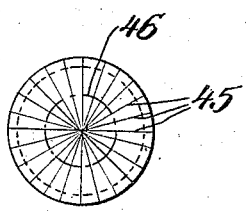

UNITED STATES PATENT OFFICE.

ANDREW G. PAUL, OF BOSTON, MASSACHUSETTS.

VALVE FOR USE IN HEATING SYSTEMS.

1,237,252.  Specification of Letters Patent. Patented Aug. 14, 1917.

Application filed June 19, 1913. Serial No. 774,541.

*To all whom it may concern:*

Be it known that I, ANDREW G. PAUL, a citizen of the United States, and a resident of Boston, in the county of Suffolk and State of Massachusetts, have invented a new and useful Improvement in Valves for Use in Heating Systems, of which the following is a specification.

The principal object of my invention is to mechanically separate, or discriminate between the flow of, fluids having different characteristics, applied particularly to liquids and gases from vapors. By "gas" I mean an elastic fluid which is non-condensable at ordinary temperatures and pressures, such as air. By "vapor" I mean an elastic fluid which is condensable at ordinary temperatures, such as steam. My invention is applicable to methods and apparatus for heating and refrigerating by the circulation of vapor, and is also applicable to other methods or apparatus in which a separation of, or discrimination between the flow of, fluids having different characteristics, and particularly a separation, or discrimination of flow, of liquid from vapor or liquid and gas from vapor, is required. My invention is particularly adapted for the separation of the water of condensation and the air from the steam in a steam-heating system or other steam apparatus whereby the water and air are permitted to escape therefrom without substantial loss of steam. I will describe my invention in connection with a steam-heating system, but it is understood that it is by no means limited to its use therein.

My invention consists in the method and apparatus hereinafter described and set forth in the claims and illustrated by the drawings forming a part of this application, in which—

Figure 1 is a view of a valve with the casing in section, and a plain disk as the valve member.

Fig. 1ᴬ represents a bottom view of a valve disk of the type of that shown in Fig. 1 having capillary passages indicated thereon.

Fig. 2 is a section of a modified valve member.

Figs. 3 to 8 show modifications of the valve member.

Figs. 9, 10 and 11 represent adapters having secondary valve seats.

The device shown in Fig. 1 consists of a valve casing 1 provided with the usual seat 2 and with the inlet passage 3, the outlet passage 4 and the cap 5. The valve member illustrated in this figure consists of a single convex disk 10 which is loosely placed upon the seat 2 and which normally rests thereon as a result of its own weight. Guides 40 are placed in the casing 1 so that the position of the valve member will always be such as to cover the opening in the seat 2. These guides may be ribs 40 formed integral with the casing 1. There may be as many of these as desired. The guides prevent a possible displacement of the disk 10 by unusual conditions within the valve or other causes. The contacting surface between the disk 10 and the valve seat 2 is preferably a single line, although this is not essential to the operation of the device. It will be seen that when the disk 10 is convex the line of contact between the disk and the seat will be the inner edge of the seat opening into the outlet passage 4. The position of this line depends upon the curvature and diameter of the disk 10. The disk and the seat are purposely formed in such a way that the surfaces of the two are not in continuous contact but contact at certain points or places in their surfaces, and in between these points in the line of contact are formed capillary ducts. This construction can be secured by making the lower surface of the disk, or the upper surface of the seat, or both of them, somewhat roughened, or with irregularities, in the process of manufacture, which will prevent continuous contact, and leave capillary passages in between; or the under surface of the disk or the upper surface of the seat, or both of them, may be formed with fine grooves or passages which will produce capillary ducts when the disk is seated, as shown in Fig. 1ᴬ.

In the device of Fig. 1 there exists a large number of openings of very small cross-section, or, in other words, capillary passages between the valve member and its seat and leading from the inlet to the outlet passages of the valve when it is seated. They exist between the disk 10 and its seat 2 along their line of contact and are consequently very short.

The illustration in Fig. 1ᴬ is a valve disk of the type shown in Fig. 1 with lines 45 indicating grooves of small cross-section cut on the contacting surface of the disk. The line 46 is intended to illustrate the line of contact of the disk 10 with the seat 2. The grooves 45 may be made in the under surface of the disk in any well-known manner such as by cutting, stamping or filing. They are shown as extending entirely across the surface of the disk but it is not necessary that they so extend across the surface of the disk. This is desirable, however, because the disk will then not be limited to any size seat as long as the opening in the seat is smaller than the diameter of the disk. These grooves in a given valve are capillary at the line of contact between the member and the seat and for a short distance on either side of the line of contact. The member illustrated in this figure is an alternative of the one illustrated in Fig. 1. The construction of Fig. 1 is preferable because it is cheaper to manufacture.

While I do not intend to be limited by any theory of operation of my device, as I have sufficiently described the construction thereof to permit any one skilled in the art to make the same, I will, nevertheless, state what I believe to be the theory of operation of the device described above.

I have found by numerous experiments that valves constructed in accordance with the above description, when attached, for instance, to the discharge end of a radiator in a heating system, will discriminate very sensitively between the flow of air and water of condensation and steam and will effectively prevent the escape of any substantial amount of steam. I attribute this property of the valve to the fact that the air will pass through the small capillary passages between the disk and its seat and enter the discharge passage. When the water of condensation arrives at the valve it is drawn by capillary attraction into the small passages between the disk 10 and its seat, and as there is then a difference of pressure between the upper and lower sides of the disk 10, this water is forced through these small passages in small amount in the beginning. As soon as the water is given a flow or movement through these passages between the seat and the disk, the body of water to be discharged is transformed from a static body into a flowing body which has the effect of lifting the disk 10 away from the seat 2 and thereby increasing the communication between the two sides of the valve. This has the effect of reducing the difference in pressure between the inlet and outlet of the valve, as a result of which the principal force necessary thereafter to hold the valve open is that required in lifting or suspending the disk. This lifting effect of the water upon the disk transforms the capillary passages into passages of larger cross-section, which, in turn, permit of an increased lifting effect and thereby cause the valve to be raised to a point sufficient to allow the water to be discharged. As soon as the water has been discharged from the valve the lifting effect will cease and the weight of the disk will cause it to seat. When the valve is seated the difference of pressure on the sides of the disk which is then increased will hold it firmly seated. When the disk is thus seated the passage from the inlet to the outlet side of the valve is again made capillary in character. When the steam reaches the valve, therefore, it will find only capillary passages and as the characteristics of steam are radically different from those of water or air, it is found, as a matter of fact, that the steam will not flow in any substantial amount through these capillary passages. It is my present belief that as the steam tends to pass through the capillary passages any amount, however small, which might gain entrance, will condense and as there is not sufficient water at this time to cause the lifting effect above described, the passages remain capillary in character and effectively prevent the passage of steam.

The valve member illustrated in Fig. 2 consists of a disk 10 having a projection 7 which loosely fits in the discharge passage, one of the functions of this projection being to hold the disk in position. The main body of the disk rests upon a seat such as 2 of Fig. 1 and is provided with one or a plurality of capillary passages 6. The number of these passages may be as great as desired.

The device shown in Fig. 2 operates in general on the same principle as that shown in Fig. 1 with the added result of a somewhat increased sensitiveness, due to the provision of the capillary openings 6 extending through the body of the disk.

Ordinarily, however, when the valve member of Fig. 2 is in the position shown by the valve member 10 of Fig. 1 the lower surface of the disk 10 and the surface of the seat 2 are so formed that when the disk rests upon the seat the surfaces of the two will be in substantially continuous contact so as to make a substantially tight joint. In this case the flow through the valve will be entirely through the capillary passages 6. I have found that in a valve so constructed the air and water will escape through the passages 6, but these passages, being capillary in character, will prevent the escape of any substantial quantity of steam. In such a construction it is necessary to adapt the size of the valve, and the number of the capillary passages 6, to the size of the radiator, or to the amount of air and water which will ordinarily have to be discharged from the apparatus with which the device is connected. In the form in which capillary passages are provided between the surface of the disk and the surface of the seat, a more ready discharge of air will be secured because the air will flow through the upper passages 6, while the water is escaping through the passages between the disk 10 and the seat 2.

The valve members represented in Figs. 3 and 4 may be identical, but it will be noticed that the coöperating members are somewhat different in the different illustrations.

In Fig. 3 is represented, partly in section, a structure in which there is a casing 1 having a seat 2 as in Fig. 1. There is a member 22 hereafter called an "adapter" arranged to rest on the seat 2, and having a seat 39 hereinafter called a secondary seat. By adapter I mean a member which will permit the use of a given valve with a seat of any size. Mounted on the adapter 22 is a screen 21. The screen 21 is preferably a section of tube having slots 23 cut in one end thereof. The metal between the slots has a spring action to hold the screen in place on the adapter by pressing against an annular projection 43 on the adapter. Mounted on the screen 21 is a collar 12. The collar 12 may have an annular projection or shoulder 38 on its under side similar to that on the adapter. The projection 38 fits snugly inside the upper end of the screen and thereby makes a rigid structure composed of the adapter 22, the screen 21 and the collar 12. Mounted in the collar 12 is a stem 8 having an external screw-threaded top with locknuts 9 by which the position of the valve member 10 with relation to the cup 11, which is rigidly mounted on the lower end of the stem, may be regulated and maintained. The stem is of such length that it extends below the seat of the valve. The cup 11 therefore which is mounted in the lower end of the stem is also below the seat 2 when in position. The valve member 10 rests on the secondary seat 39 on the adapter and its normal seated position is thereby determined. The stem 8 passes through a valve member 10 which is slidably mounted thereon. In the valve member 10 is an opening bored approximately one-one-hundredth of an inch larger in diameter than the stem 8 for reasons to be discussed hereinafter. The valve member is preferably, but not necessarily, conical in shape and a portion thereof is cut away, forming a shoulder 13 on the lower part thereof. The portion 14 projecting below the shoulder is adapted to fit snugly into the cup-shaped member 11, which is carried on the lower end of the valve stem, the cup member being cut away in its upper interior portion so as to receive the lower portion 14 of the valve member 10 and so form a pressure area between them. Normally the nuts 9 are so adjusted that there is a little space between the portion 14 and the upper part of the cup 11 when the valve member is seated. The stem is provided with a longitudinal pasasge 15 extending from near its lower end to a point near the top of the member 10 when in its seated position, and it is also provided with openings 16 leading from the passage 15 to the exterior of the stem. These holes 16 may be of any number desired, but when employed they are preferably of small diameter. One, or one set of the openings 16 is provided a short distance below the top of the valve member 10 when in its seated position and another, or another set, is provided at a point opposite the lower end of the projection 14 on the lower portion of the valve member 10 when in its normal seated position, so that when the valve member is seated these openings at the lower end of the same will be partly closed by the projection 14 on the valve member. The passages 16 are in open communication with the central longitudinal passage 15. On the outer surface of the stem a circumferential passage 17 is provided which is on a level with the lowest passages 16 and which tends to equalize the pressure within the cup member 11. This passage 17 is partly covered by the lower end of the projection 14 of the valve when the valve is in its seated position. The passage in the stem is closed at the lower end by any suitable means such as riveting it over or by plugging it.

The operation of the device shown in Fig. 3 is as follows: When the air comes to the valve the air will escape through the capillary passages between the secondary seat 39 of the adapter 22 and the valve member 10, and also through the passage 42 between the member 10 and the stem 8. The air can flow directly downward through this last-mentioned passage to the cup, and then out through the passage between the cup and the depending portion 14 of the valve member, or the air can flow through the upper passage 16 into the passage 15, and down through the passage 15 and out through the lower passages 16 into the cup member, and escape in that way. When water comes to the valve the water will be drawn into the capillary passages between the valve 10 and the secondary seat 39 of the adapter in a manner already explained in connection with the device of Fig. 1. When these capillary passages are filled with water, there will be a flow of water through the same, and this flow of water will tend to lift the valve member 10 as already explained in connection with Fig. 1, and will open the passage between the member 10 and the secondary seat, and permit the water to escape freely. The lifting of the valve member 10 is accelerated by the action of the current of air flowing down through the passage 42 between the stem and the valve member, and through the passage 15—16 by reason of the fact that this air escaping into the space between the cup member 11 and the lower portion 14 of the valve member, tends to equalize the pressure in that space with the pressure in the interior of the valve, and thereby decrease the differential pressure on the two sides of the valve member 10. This causes the action of the water flowing through the capillary passages to be more effective, and to lift the valve member 10 more readily. When steam comes to the valve it will not escape because no substantial quantity of steam can flow through the capillary passage 42 between the valve and the stem. Should any steam escape into the passage 15 in the stem, and tend to flow through the lower passage 16, it will be prevented from escaping by the fact that the projection 14 on the valve substantially or nearly closes this passage. The position of the cup 11 with relation to the valve member 10 when the latter is in seated position, can be changed and adjusted by screwing the nuts 9 up or down on the stem, and thereby lifting or lowering the stem and cup relatively to the other parts. When the stem is lowered the space between the lower end of the projection 14, and the wall of the cup, is increased, and the lower passage 16 is not shut off to the same extent by the projection 14 when the valve member is seated. In this condition a flow of air through the passage 15 and the passages 16 will be more rapid, and the pressure within the cup 11 below the projection 14 will therefore be greater, and the valve 10 will lift more readily. By adjusting the position of the cup, therefore, the valve 10 can be made to lift more readily, and I believe that, under these conditions, it rises higher and gives a wider opening. By using an adapter 22, which provides a secondary seat for the valve, a valve device like that shown in Fig. 3 can be made in a certain size and used with various sizes of casing, by simply using an adapter of the proper diameter. The purpose of the screen 21 is to prevent dirt, or other foreign substance, from flowing into the interior of the valve from the outer chamber of the valve casing. When the parts are assembled, as shown in Fig. 3, they can be adjusted and tested and are then ready to be placed in the main casing in a heating system or other place. This assures a proper adjustment of the parts so that the future operation of the valve is more satisfactory than if it had to be adjusted in the main casing in which it is applied. Other advantages of this structure will be apparent. It must be understood, however, that the valve can be made to operate satisfactorily without this exact construction.

Fig. 4 represents a device similar in most respects to that represented in Fig. 3. This device differs from that of Fig. 3 in that the stem is reduced in diameter from a point just below the top of the valve member, when seated, to the lower end of the stem, and also in the fact that the cup member is provided with passages 18 leading from the outer surface into the lower portion of the cavity therein. These passages 18 may be so positioned that the projection 14 on the valve member will approximately cover them when the member is in its normal seated position. This arrangement of passages with regard to the projection 14 is for the purpose of regulating the flow of liquid and gas through the valve, which regulation is accomplished by the opening and closing of the passages 18 by the projection 14, the same as that of the projection 14 with relation to the passages 16 in Fig. 3. The position of the valve member relatively to the passages 18 in the cup 11 and stem 8 may be adjusted by the nuts 9 on the upper end of the stem, as in Fig. 3. The device shown in Fig. 4 is preferably used in coöperation with an adapter, screen and collar the same as shown in Fig. 3 and described hereinbefore. It is understood that a passage 42 of increased cross-section between the valve member and the stem may be obtained by other means than that shown with satisfactory results, the object being to get an increased passage at this point and thereby a decreased resistance to flow. The capillary longitudinal passage in the stem in this modification extends through the entire length thereof with the exception of a short portion near the bottom. There are passages 16 leading from the longitudinal passage to the surface of the stem as in the modification described heretofore.

The general theory of operation of the device shown in Fig. 4 is the same as that of Fig. 3. The passage through substantially the entire length of the stem causes a greater decrease of the difference of pressure on the upper and lower sides of the valve member, however, than is obtained in Fig. 3 and consequently the amount of liquid or gas permitted to escape from the valve in a given time is increased, while the escape of vapor is prevented. One reason for the greater decrease of difference of pressure on the sides of the member 10 is due to the fact that the effective passage through the stem in this case is larger than in Fig. 3. This causes a greater pressure to be produced between the cup member 11 and the projection 14 which pressure tends to raise the member 10. This helps the water to lift the valve member and consequently the valve is opened quicker and probably wider so that more water will flow out in a given time. The passages 18 permit a freer and more rapid flow into the discharge pipe of the contents of the space between the projection 14 and the cup. This causes a more rapid flow of contents from the passage in the interior of the stem to the discharge pipe. This increased velocity of the escaping current tends to make the valve more sensitive and to cause it to lift more readily against the difference of pressure on its upper and lower sides. By means of the nuts 9 the relative position of the lower end of the projection 14 and the passages 18 can be adjusted so that the projection 14 can be made to more or less cover the end of the passages 18 when the valve is in its normal seated position, and in this way the velocity of the outflowing current can be regulated.

In Fig. 5 is illustrated another modification of my device. This device may be used in connection with an adapter, screen and collar the same as described in connection with Fig. 3, but I prefer to use an adapter of the construction shown, that is, one having capillary passages 37 arranged to allow air or water to pass through and impinge upon the valve member below its line of contact with the seat. The forms of adapter shown in Figs. 9, 10 and 11 and described hereinafter may be used if desired. It also has a stem 8 with an external screw thread and provided with suitable nuts 9 for adjusting the position of the valve member relatively to the enlargement 19 which is carried by the stem as the cup 11 is in Fig. 3. The valve member in this modification is a conical member with spiral grooves 20 which may increase in depth of cut from near the upper to the lower end of the member. The grooves are so positioned that their upper end is normally below the line of contact of the valve member with its seat. There is normally a space between the lower surface of the member 10 and the upper face of the enlargement 19, which enlargement is carried on the lower end of the stem. While this enlargement in the present modification has a flat upper surface, it is to be understood that satisfactory results may be obtained by substituting therefor a member such as shown in Figs. 3 and 4, or it may be otherwise varied. While I have shown the valve member provided with grooves 20, I wish it to be understood that it may be provided with projections of other forms with satisfactory results.

The device shown in Fig. 5 has a secondary passage between the valve member and the stem but it does not have any openings in the stem. There are spiral grooves in the valve member which materially increase the opening through which liquid may flow after the valve has been initially raised. The provision of the secondary passage in this modification in no way affects the efficiency of the valve to prevent the flow of vapor, for the reason that the passage is too small and too long for the flow of steam. Instead of using the form of adapter used in Fig. 5, other forms of adapter could be used, such as are used in Figs. 9 to 11.

Fig. 9 represents a single piece adapter. It comprises a body portion 35 having a flange 36. The diameter of the flange may be any size desired. It also has a secondary seat 39. It will be seen that by the use of an adapter of the proper size with a given outlet passage the effective size of the outlet passage can be regulated so that different size valves may be used on the same passage at different times.

Fig. 10 represents an adapter comprising two pieces 29 and 30. The member 30 is adapted to rest upon the seat of the casing and its upper surface may be either flat, concave or convex. The member 29 rests upon the upper surface of the member 30 and the lower surface of 29 has a similar curvature to that of the upper surface of member 30. It is to be noted, however, that the lower surface of the member 29 is of less curvature than the upper surface of member 30 so that the line of contact is at the outer edge of the members. By this arrangement a set of capillary passages exists between the members 29 and 30 as explained in connection with the member 10 and seat 2 of Fig. 1. This set is in addition to that between the valve member and the member 29 and that between the member 30 and the seat on the casing. This adapter also has a secondary seat 39. Satisfactory results have been obtained with numerous variations of the degree and nature of the curvatures of these two surfaces, however, and I am not limited to that shown in the drawing.

Fig. 11 represents a structure which has a member 31 arranged to receive a member 32 by screw threads. The member 31 has projections 41 on the lower side thereof so that when placed upon a seat, such as 2 of Fig. 1, there will be passages of a given size between the member 31 and its seat. By screwing the member 32 down the effective size of these passages can be regulated and the operation of the valve accordingly modified. The member 32 has a secondary seat 39 to receive the valve member.

The theory of operation of the device of Fig. 5 is the same as that advanced above in regard to Fig. 3. In addition to that operation, however, the valve illustrated in Fig. 5 is rendered more sensitive in its operation, due to the fact that the horizontal passages in the adapter allow water to pass through and impinge upon the projections between the grooves 20 on the valve member as a result of which the water issuing through these passages tends to revolve and lift the valve member whereby the water may issue more freely both through these passages and also between the disk and its seat.

It will be observed that the shape of the valve members shown in the modifications of Figs. 3, 4 and 5 is different from those of Figs. 1 and 2, and, among other things this means, that with a given upward movement, the effective opening between the valve and its seat will be greater in these modifications, thereby allowing a greater amount of liquid to flow with a given upward movement of the valve member. In these modifications, it will also be observed that a path for the escape of gas is provided between the valve member and its stem in addition to the passages between the valve member and its seat and those between the adapter and the seat of the casing when an adapter is used. The effective area of the passage between the member and the stem is also increased by the provision of the passages within the stem in Figs. 3 and 4, as a result of which the gas will find a path of lower resistance than if these passages were not provided.

Fig. 6 shows a modified form of valve member. This consists of a central portion 25 provided with a disk-shaped enlargement 10 which acts as the valve member proper. The enlargement 10 may be flat, concave or convex. The valve member is shown in Fig. 7 in combination with other parts and will be considered therein. Its operation, however, is substantially the same as that of the valve members described heretofore.

The device illustrated in Fig. 7 comprises an adapter 22, screen 21 and collar 12, as described in connection with Fig. 3. It also has a stem 8 provided with a screw-threaded top and having suitable nuts 9 mounted thereon by which the position of the member 10 with relation to the member 11 may be adjusted as above described. The stem passes through the valve member 10 and carries the cup member 11 on its lower end. The adapter 22 which supports and holds a screen 21 makes it possible to apply the structures illustrated in Figs. 3 and 7 to any size of discharge orifice. The adapter 22 is placed in the main valve casing and rests with its lower surface upon the seat of the casing. It is provided with an opening and a secondary seat 39 which acts in co-operation with the valve member 10. The valve member here shown is the same as shown in Fig. 6. This member is similar in general shape to that used in Fig. 1, but it is slidably mounted on a stem which has passages therethrough and also a passage between the member and the stem the same as described in connection with Fig. 3. The secondary seat here shown is of the same general shape as the member 10 but its curvature is greater whereby the contacting surface between the member and its seat is along the outside thereof. These conditions may be reversed, however, as in Fig. 1. It will be seen that the valve stem is supported from the collar 12 through the screen 21 which may be carried by the seat of the casing through the adapter 22 as shown. There are many advantages in this arrangement of parts, one of which is that I may assemble my valve as shown in Fig. 7 complete in the factory and when once adjusted it may be placed in its working position in good order and adjustment for proper operation. It can then be inserted in any main casing. Another advantage of this arrangement is that the seat upon which the valve works is carried by the adapter as a result of which the operation of the valve may be tested in the factory under the same conditions under which it will operate in service. The operation of the device shown in Fig. 7 is substantially the same as that of Fig. 3.

Fig. 8 represents a device similar to that of Fig. 7. This device has a stem 8, a collar 12, screen 21 and adapter 22, the same as illustrated in Figs. 3 and 7. In this modification the member 11 is provided with a flange 24 which is adapted to close the orifice through the adapter when raised into contact therewith. The stem 8 is suspended in this modification from the cap 26 so that by removing the cap 26, and lifting it, or the cap 27 and lifting the stem 10, the complete valve structure may be removed from the seat of the casing. This is a desirable feature for the reason that when it becomes necessary or desirable to use the valve as a by-pass or "blow-out" it can be done by removing the cap 27 and raising up the stem with the parts mounted thereon or by removing and lifting the cap 26, which accomplishes the same result. There is another feature about the arrangement of the device shown in Fig. 8 in that the member 11 with the flange 24 may act as a check valve to prevent a backward flow into the radiator or other device to which it may be attached. For the purpose of preventing back pressure from lifting the adapter off the seat of the casing a spring 28 is placed between the collar 12 and the cap 26. The operation of this valve as regards the passage of air and water and the prevention of the passage of steam is the same as that of Fig. 3. In addition to this it has the check valve operation above mentioned.

While I have shown certain combinations and modifications in the different figures I wish it to be understood that for any given size valve the parts are interchangeable so that any form of adapter may be used with any form of valve and the various other parts may be interchanged in numerous ways and still a satisfactory device will result. Also there may be numerous changes in the shape of the valve members and their coöperating parts without departing from my invention.

Having described my invention what I claim as new and desire to secure by Letters Patent is:—

1. A valve having a valve member and a seat therefor and a plurality of short capillary passages between said member and its seat.

2. A valve having a valve member and a seat therefor, and a capillary passage between said member and its seat, the length of said passage being determined by the contact of the member with its seat.

3. A valve having a valve member and a seat therefor, and a plurality of small passages between said member and its seat, the length of said passages being determined by the contact of the member with its seat.

4. A valve having a valve member and a seat therefor, and a plurality of capillary passages between said member and its seat, the length of said passages being determined by the contact of the member with its seat.

5. A valve having a valve member and a seat therefor, and a row of capillary passages between said member and its seat.

6. A valve having a valve member and a seat therefor and a circular row of capillary passages between said member and its seat.

7. A valve having a valve member and a seat therefor and a plurality of short passages of small cross-section between said member and its seat.

8. A valve having a valve member and a seat therefor and a plurality of small passages between them when the member is seated.

9. A valve having a valve member and a seat therefor, and small short passages between them when the member is seated.

10. A valve having a casing with a seat and a valve member adapted to coöperate therewith and a plurality of short capillary passages between said seat and member when the member is seated.

11. A valve having a high pressure and a low pressure side, and a plurality of short capillary passages connecting the two sides.

12. A valve having a high and a low pressure side and a plurality of small short passages connecting said sides when the valve is seated.

13. A valve comprising a casing having a seat therein, a high and a low pressure side in said valve, a valve member between said sides adapted to coöperate with said seat and having a plurality of capillary passages connecting the sides.

14. A valve having a casing with a seat, a valve member adapted to coöperate therewith and a capillary passage between said seat and member, said member being adapted to open against the flow of liquid therethrough.

15. A valve having a casing with a seat, a valve member adapted to coöperate therewith and a capillary passage between said seat and member, said member being adapted to automatically open against the flow of liquid therethrough.

16. A valve comprising a casing, a seat therein, a stem mounted in said casing, a valve member mounted on said stem and having a projection thereon, a cup member on said stem and adapted to receive the projection on said valve member.

17. A valve comprising a casing, a seat therein, a stem mounted in said casing, a cone-shaped valve member mounted on said stem and having a cone-shaped projection thereon, a cup member on said stem and adapted to receive the cone-shaped projection on said valve member.

18. A valve comprising a casing having a seat, a stem having openings therein, a valve member mounted on said stem, an adapter adapted to rest on said seat and receive said valve member.

19. A valve comprising a casing having a seat, a valve member and an adapter adapted to rest on said seat and receive said member.

20. In a valve, the combination of a main casing having a seat, an adapter having a secondary seat adapted to rest on said first seat, a screen on said adapter, and a valve member adjustably mounted inside of said screen.

21. A valve device comprising an adapter having a seat, a screen held by said adapter, an adjustable valve member coöperating with said seat all in combination with a main casing having a seat to receive said valve device.

22. In a valve device the combination of a screen, a collar carried by said screen, a stem passing through said collar, a valve member carried by said stem and means for adjusting the valve member relatively to said collar.

23. In a valve device the combination of an adapter, a screen coöperating therewith, a collar mounted on said screen, a stem carried by said collar and a valve member mounted on said stem.

24. In a valve device the combination of an adapter having a seat, a member coöperating with said adapter, a member mounted on said first-named member, a stem carried by said last-named member and a valve mounted on said stem and adapted to coöperate with the seat on the adapter.

25. In a valve device the combination of an adapter having a secondary seat, a stem passing through said adapter and a valve member guided by said stem and adapter to coöperate with said seat.

26. A valve comprising a casing, a seat therein, a stem mounted in said casing and projecting through the opening in the seat, a valve member slidably mounted on said stem having a small passage between the valve member and the stem, the valve member having a projection on the exterior thereof, a member carried by said stem on the outer side of the seat and adapted to coöperate with the projection on the valve member so as to form a pressure area between the same whereby the pressure on the outer side of the said valve member is automatically regulated, and the opening of the valve thereby controlled.

27. In a valve device the combination of an adapter having a secondary seat, a screen, a member mounted on said screen, a stem carried by said member and extending through the adapter and a valve member loosely mounted on said stem and adapted to coöperate with said seat so as to produce a capillary passage between said member and the seat.

28. In a valve device the combination of a seat, a screen mounted thereon, a stem mounted on said screen and extending through an opening in said seat and a valve member mounted on said stem and adapted to coöperate with said seat so as to form a capillary passage between said member and seat when the member is seated.

29. In a valve device the combination of a seat, a stem passing through an opening in said seat, a member carried by said stem below said seat, a valve member mounted on said stem and adapted to coöperate with said seat so as to form a capillary passage between said member and seat when the member is seated.

30. In a valve, the combination of a seat, a valve member adapted to coöperate with said seat to produce a high and a low pressure side in said valve, passages connecting the said sides and means for regulating the effective size of the outlet passage.

In testimony whereof, I have signed my name to this specification, in the presence of two subscribing witnesses.

ANDREW G. PAUL.

Witnesses:
NEWTON A. BURGESS,
EDWIN SEGER.

Copies of this patent may be obtained for five cents each, by addressing the "Commissioner of Patents, Washington, D. C."